(12) United States Patent
Rommel

(10) Patent No.: US 10,465,569 B2
(45) Date of Patent: *Nov. 5, 2019

(54) ADJUSTABLE CAMSHAFT

(71) Applicant: Mahle International GmbH, Stuttgart (DE)

(72) Inventor: Juergen Rommel, Burgstetten (DE)

(73) Assignee: Mahle International GmbH (DE)

(*) Notice: Subject to any disclaimer, the term of this patent is extended or adjusted under 35 U.S.C. 154(b) by 0 days.

This patent is subject to a terminal disclaimer.

(21) Appl. No.: 15/367,159

(22) Filed: Dec. 1, 2016

(65) Prior Publication Data

US 2017/0159513 A1  Jun. 8, 2017

(30) Foreign Application Priority Data

Dec. 2, 2015  (DE) .......................... 10 2015 224 015

(51) Int. Cl.
*F01L 1/047* (2006.01)
*F01L 1/344* (2006.01)
*F16H 53/04* (2006.01)

(52) U.S. Cl.
CPC ........... *F01L 1/34413* (2013.01); *F01L 1/047* (2013.01); *F01L 1/3442* (2013.01); *F16H 53/04* (2013.01); *F01L 2001/0473* (2013.01)

(58) Field of Classification Search
CPC ....... F01L 2001/0473; F01L 2001/0471; F01L 2001/0475; F01L 1/34413; F01L 1/047; F01L 1/34416; F16H 53/04; F16H 53/02; F16H 53/025; F16H 25/10

See application file for complete search history.

(56) References Cited

U.S. PATENT DOCUMENTS

| | | | |
|---|---|---|---|
| 5,235,939 A | * | 8/1993 | Levin ...................... F01L 1/047 123/90.15 |
| 7,246,580 B2 | | 7/2007 | Palesch et al. |
| 8,122,863 B2 | | 2/2012 | Myers |

(Continued)

FOREIGN PATENT DOCUMENTS

| DE | 10320639 A1 | 11/2004 |
|---|---|---|
| DE | 102009041873 A1 | 4/2010 |

(Continued)

OTHER PUBLICATIONS

Machine Translation of DE 10 2013 113 255, obtained Nov. 29, 2017.*

(Continued)

*Primary Examiner* — Richard W Ridley
*Assistant Examiner* — Brian J McGovern
(74) *Attorney, Agent, or Firm* — Fishman Stewart PLLC

(57) ABSTRACT

An adjustable camshaft may include an inner shaft and an outer shaft arranged coaxially thereto, and a phase shifter having a stator and a rotor. The stator may be connected to the outer shaft in a rotationally fixed manner, and the rotor may be connected to the inner shaft in a rotationally fixed manner. On an outside of the outer shaft, a first connection contour may be provided. The first connection contour may interact with a second connection contour on the stator formed complementarily thereto in a form-fit manner and enabling at least a tolerance offset in an axial direction.

7 Claims, 2 Drawing Sheets

(56) References Cited

U.S. PATENT DOCUMENTS

2007/0039411 A1* 2/2007 Lechner .................. F01L 1/047
                                                                74/567
2012/0132160 A1 5/2012 Malen et al.

FOREIGN PATENT DOCUMENTS

| DE | 102011076652 A1 | 11/2012 | |
|---|---|---|---|
| DE | 102011086236 A1 | 5/2013 | |
| DE | 102012105284 A1 | 12/2013 | |
| DE | 102013113255 A1 * | 6/2015 | ............. F01L 1/047 |
| EP | 0254058 A2 | 1/1988 | |

OTHER PUBLICATIONS

Machine Translation of DE 10 2011 086 236, obtained Nov. 29, 2017.*
Machine Translation of DE 10 2012 105 284, obtained Jun. 26, 2018.*
English abstract for DE-102011076652.
English abstract for DE-102012105284.
English abstract for DE-102011086236.
European Search Report for EP Application No. 16198834.0 dated Mar. 31, 2017.
English Abstract for EP 0254058.

* cited by examiner

ADJUSTABLE CAMSHAFT

CROSS-REFERENCE TO RELATED APPLICATION

This application claims priority to German Patent Application No. DE 10 2015 224 015.0, filed on Dec. 2, 2015, the contents of which are incorporated by reference in its entirety.

TECHNICAL FIELD

The present invention relates to an adjustable camshaft with an inner shaft and an outer shaft arranged coaxially thereto. The invention additionally relates to an internal combustion engine with at least one camshaft.

BACKGROUND

Adjustable camshafts have already been employed in modern internal combustion engines for a long time and serve for controlling valve opening times. By twisting an inner shaft relative to an outer shaft a first cam that is connected to the inner shaft in a rotationally fixed manner can be twisted relative to a second cam that is connected to the outer shaft in a rotationally fixed manner and thereby the valve opening time or the valve closing time be extended or shortened. The relative twisting of the inner shaft relative to the outer shaft is usually brought about by a so-called phase shifter, the rotor of which is connected to the inner shaft in a rotationally fixed manner and the stator of which is connected to the outer shaft in a rotationally fixed manner. In the case of camshafts known from the prior art to date, axial fixing of the adjustable camshaft usually took place as well, i.e. its inner shaft and its outer shaft via the phase shifter, wherein the inner shaft was connected in axial direction fixed to the rotor of the phase shifter and the outer shaft in axial direction fixed to the stator of the phase shifter. The stator in this case forms the housing in which the rotor runs.

Since the phase shifters are hydraulically actuated, the clearances between rotor and stator should be kept comparatively small in order to avoid in particular unnecessary leakage losses. Because of production tolerances it can now happen in the case of very close tolerances in the phase shifter that even small inclined positions or production tolerances of the inner shaft lead to the rotor jamming relative to the stator. The present invention therefore deals with the problem of stating an improved or at least an alternative embodiment for an adjustable camshaft of the generic type, which makes possible in particular an at least small tolerance offset even upon an inclined position of a camshaft relative to a phase shifter.

SUMMARY

According to the invention, this problem is solved through the subject of the independent claims. Advantageous embodiments are subject of the dependent claims.

The present invention is based on the general idea of creating an axial and/or inclined adjusting possibility between an outer shaft of an adjustable camshaft and an associated stator of a phase shifter, which makes possible a tolerance offset of an inner shaft standing obliquely to a rotor of the phase shifter by a following of the stator. The adjustable camshaft according to the invention in this case comprises in known manner an inner shaft and an outer shaft arranged coaxially thereto, likewise a phase shifter, the stator of which is connected to the outer shaft in a rotationally fixed manner and the rotor of which is connected to the inner shaft in a rotationally fixed manner. On an outer width of the outer shaft a first connecting contour is now provided according to the invention, which interacts in a form-fit manner with a second connection contour on the stator formed complementarily thereto and makes possible at least a tolerance offset in axial direction between the stator and the outer shaft of the adjustable camshaft. Through the connection contours provided according to the invention both on the outer shaft and also on the stator of the phase shifter it is thus possible that the stator of the phase shifter and thus the housing of the phase shifter is able of offsetting production tolerances for example between inner shaft and rotor. In particular it can be made possible through the first and second connection contour to reliably prevent jamming of the rotor relative to the stator of the phase shifter, wherein obviously the first and second connection contour can also be formed in such a manner that these make possible an at least slight inclined position between stator and outer shaft and in the process for example are capable also of offsetting greater inclined positions between rotor and inner shaft for example.

In a further advantageous embodiment of the solution according to the invention, a third connection contour is provided on an outside of the inner shaft which interacts in a form-fit manner with a fourth connection contour on the rotor formed complementarily thereto and likewise makes possible at least a tolerance offset in axial direction. Because of this, the offset of production tolerances between the inner shaft and the rotor is also possible, as a result of which the entire camshaft according to the invention need no longer be produced with the high production precisions required up to now and thus produced expensively.

In a further advantageous embodiment of the solution according to the invention, the first connection contour is integrally formed with the outer shaft. Such an integral design of the first connection contour with the outer contour can take place for example by milling the first connection contour into the outer surface of the outer shaft, wherein such a first connection contour can obviously also be produced by upsetting the outer shaft. The first connection contour produced integrally with the outer shaft in this case also offers in particular the advantage that the same need not be subsequently mounted with the outer shaft, as a result of which assembly costs can be avoided.

Alternatively to this it is also conceivable that the first connection contour is arranged on a sleeve which is fastened on the outer shaft, in particular welded, glued, crimped, soldered or shrunk on. Because of this a separate manufacture or production of the first connection contour according to the invention is possible so that the camshaft according to the invention is producible by a simple mounting of the sleeve with the first connection contour on the outer shaft.

In a further advantageous embodiment of the solution according to the invention, the first and the second connection contour are formed in such a manner that they allow a radial movability and/or a tilting of the stator to the outer shaft, wherein additionally or alternatively it is also conceivable that the third and the fourth connection contour are designed in such a manner that they allow a radial movability and/or a tilting of the rotor to the inner shaft. Connection contours formed thus can be designed for example crowned, wherein it is already sufficient that the first or the second connection contour are designed crowned, but the second or first connection contour located opposite and interacting therewith in a form-fit manner however is not designed crowned. Through such a crowned design which can likewise be comparatively easily produced in terms of production, an inclined position of the stator relative to the outer shaft or of the rotor relative to the inner shaft can also be comparatively easily offset in addition to axial tolerances, as a result of which an operation of the phase shifter and thus also of the camshaft free of jamming and friction can be ensured. Because of this, in particular wear and the maintenance costs connected with the same can be reduced.

In a further advantageous embodiment of the solution according to the invention the first and the second connection contour and/or the third and the fourth connection contour is/are designed as tooth contour or as a polygonal contour. Even this non-conclusive enumeration gives an idea of the manifold possibilities given to a form-fit connection contour, wherein the connection contours merely have to ensure a torque transmission free of play. Purely theoretically it is thus conceivable that the first connection contour is designed as external hexagon or external polygon and the second connection contour as internal hexagon or internal polygon. Here, too, an incline between the outer shaft and the stator can be comparatively easily offset through a crowned design of at least one of these connection contours, in particular when the rotor is connected obliquely to the inner shaft and requires this.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description wherein same reference numbers relate to same or similar or functionally same components.

BRIEF DESCRIPTION OF THE DRAWINGS

It shows, in each case schematically.

DETAILED DESCRIPTION

Figure 1:
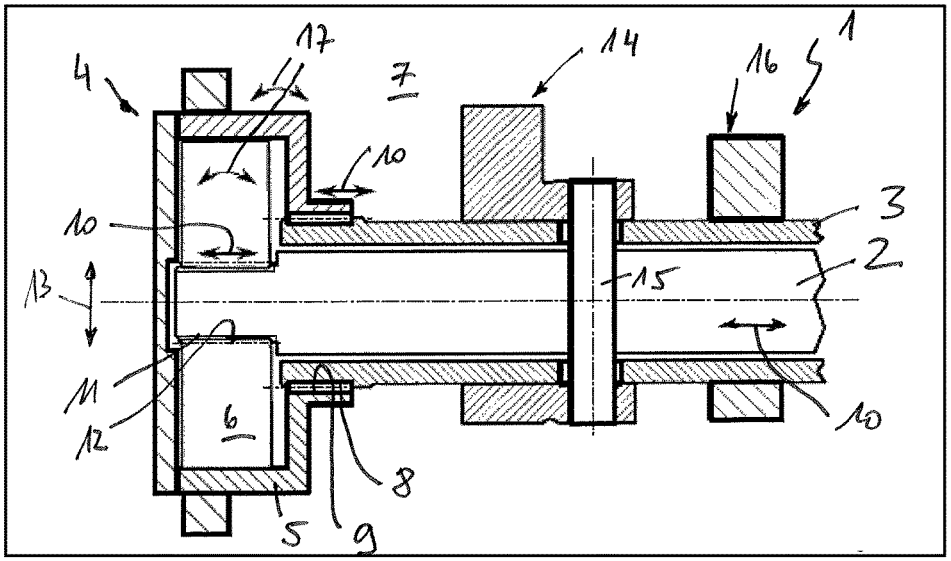
FIG. 1 a sectional representation through a camshaft according to the invention with a first connection contour designed integrally with an outer shaft of the camshaft, FIG. 2 a representation as in FIG. 1, however with a first connection contour formed on a sleeve, FIG. 3 a representation as in FIG. 1, however with an inner shaft of the camshaft screwed to a rotor of a phase shifter, FIG. 4 a representation as in FIG. 3, however with a first connection contour designed crowned on a sleeve, FIG. 5 a representation as in FIG. 2, however with a first and third connection contour designed crowned.

Corresponding to FIGS. 1 to 5, a camshaft 1 according to the invention comprises an inner shaft 2 and an outer shaft arranged coaxially thereto. An adjustment of the inner shaft 2 relative to the outer shaft 3 in this case takes place by means of a phase shifter 4, the stator 5 of which is connected to the outer shaft 3 in a rotationally fixed manner and the rotor 6 of which is connected to the inner shaft 2 in a rotationally fixed manner. Such a camshaft 1 is usually employed in an internal combustion engine 7, for example in a motor vehicle, in order to influence valve opening time.

In the case of camshafts known from the prior art to date the inner shaft 2 was connected to the rotor 6 in a fixed manner and the outer shaft 3 to the stator 5 of the phase shifter 4 in a fixed manner, wherein even a small inclined position of the rotor 6 relative to the inner shaft 2 could lead to a jamming of the rotor 6 relative to the stator 5 and thus to a function impairment, since no tolerance offset whatsoever was possible. This is where the camshaft 1 according to the invention comes in, which on an outside of the outer shaft 3 comprises a first connection contour 8, which interacts with a second connection contour 9 on the stator 5 that is formed complementarily thereto in a form-fit manner and makes possible at least a tolerance offset in axial direction 10. Because of this it is thus possible to make possible an at least minor tolerance offset between the stator 5 and the outer shaft 3, which is capable of offsetting any existing inclined position of the rotor 6 relative to the stator 5 even in the case of a rotor 6 (see FIGS. 3 and 4) that is screwed to the inner shaft 2 in a fixed manner.

In a further advantageous embodiment of the solution according to the invention, a third connection contour is provided on an outside of the inner shaft 2, which interacts with a fourth connection contour 12 on the rotor 6 designed complementarily thereto in a form-fit manner and likewise makes possible at least a tolerance offset in axial direction. Such an embodiment is shown for example in FIGS. 1, 2 and 5. Depending on design of the individual connection contours 8, 9, 10 and 12, not only a tolerance offset in axial direction 10 is possible here but also a tolerance offset in radial direction 13 and/or an offset of angular deviations between for example the stator 5 and the outer shaft 3 or the rotor 6 and the inner shaft 2, i.e. an offset upon a tilting 17.

Figure 4:
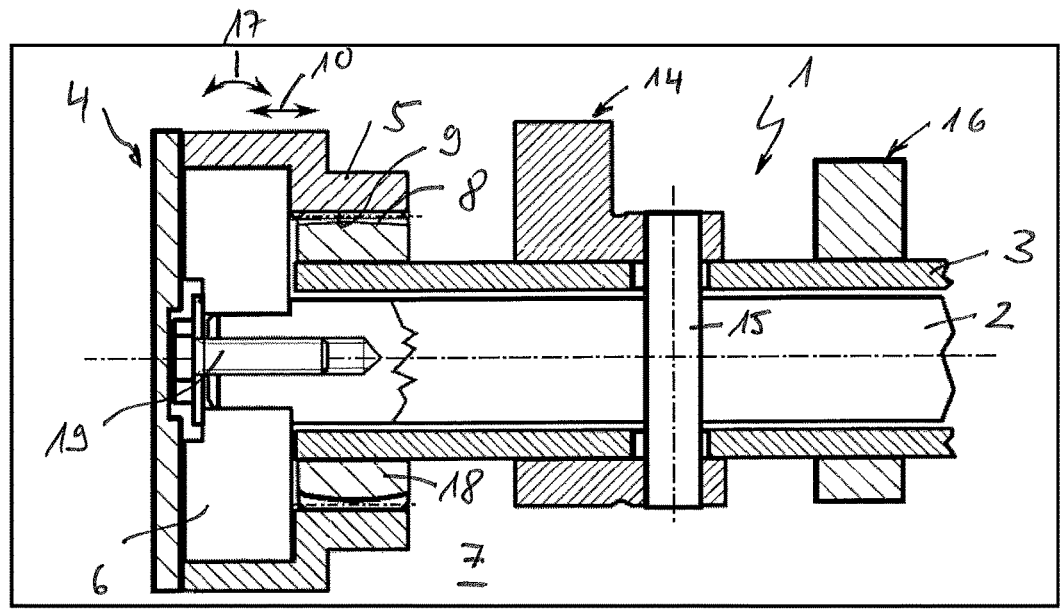
Figure 5:
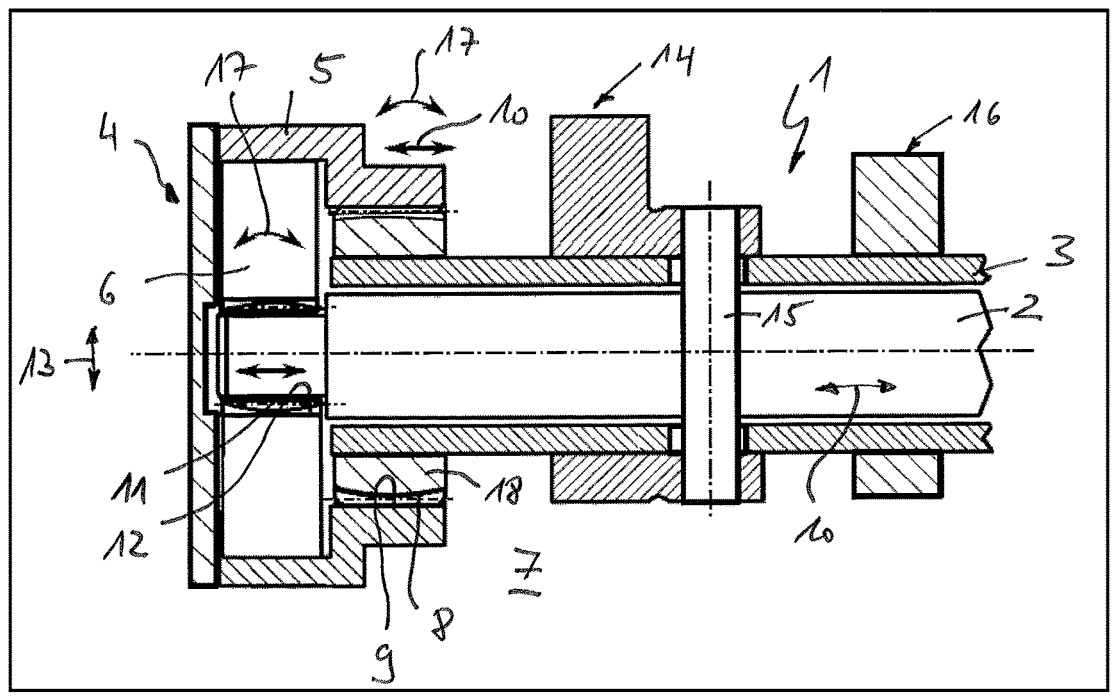

In order to be able to offset in particular a tilting 17 between for example the rotor 6 and the inner shaft 2 or the stator 5 and the outer shaft 3, the connection contours 9 and 11, 12 respectively interacting with one another either have to have a certain radial height or at least one of these connection contours 8, 9 or 11, 12 should be formed crowned, as is shown for example in the embodiments of the camshaft 1 according to the invention in accordance with FIGS. 4 and 5.

Here, all camshafts 1 have a first cam 14 which is connected to a first cam 14 via a pin 15 of the inner shaft 2 in a rotationally fixed manner and a second cam 16 that is connected to shaft 3 in a rotationally fixed manner. Here, the second cam 16 can be connected to the outer shaft for example by means of a thermal joining fit, by means of gluing, crimping, soldering or welding.

Looking now at the individual embodiments of the camshaft 1 according to the invention shown in FIGS. 1 to 5, it is evident that according to FIG. 1 a first connection contour 8 is arranged on the outer shaft 3 and an associated second connection contour 9 is arranged on the associated stator 5. The first connection contour 8 in this case is formed integrally with the outer shaft 3. In the same manner, a third connection contour 11 is provided on the inner shaft 2 and on the associated rotor 6 a fourth connection contour 12 formed complementarily thereto. The connection contours 8, 9, 11 and 12 are designed in such a manner that these make possible both a tolerance offset in axial direction 10 and also a tolerance offset with respect to a tilting 17.

Figure 2:
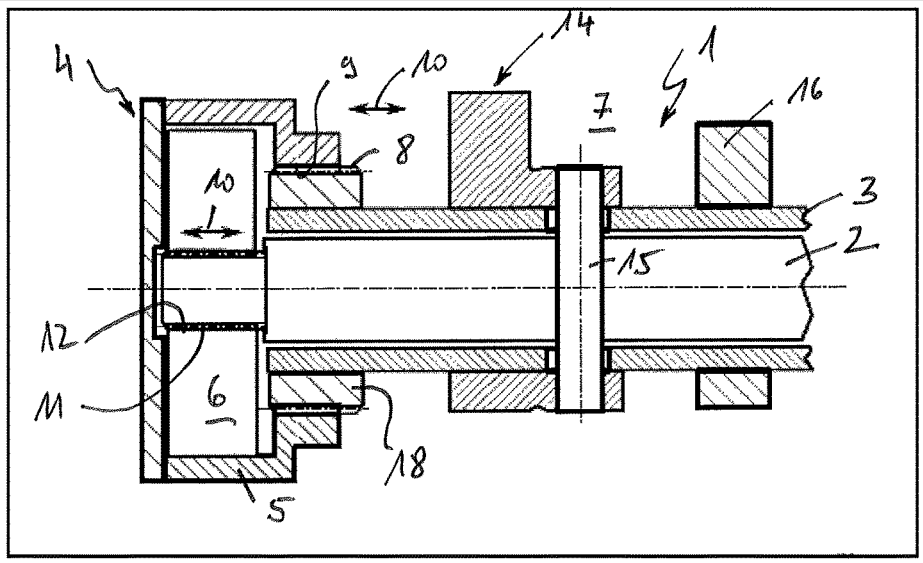

Looking at the camshaft 1 according to the invention in accordance with FIG. 2, a first connection contour 8 is evident there, but which is not formed integrally with the outer shaft 3 but on a sleeve 18, wherein the third and fourth connection contour 11, 12 are formed analogously to FIG. 1. With these connection contours 8, 9, 11, 12, too, at least a tolerance offset in axial direction 10 is possible. Here, too, tilting is possible within the scope of the axial play and of the radial play.

Figure 3:
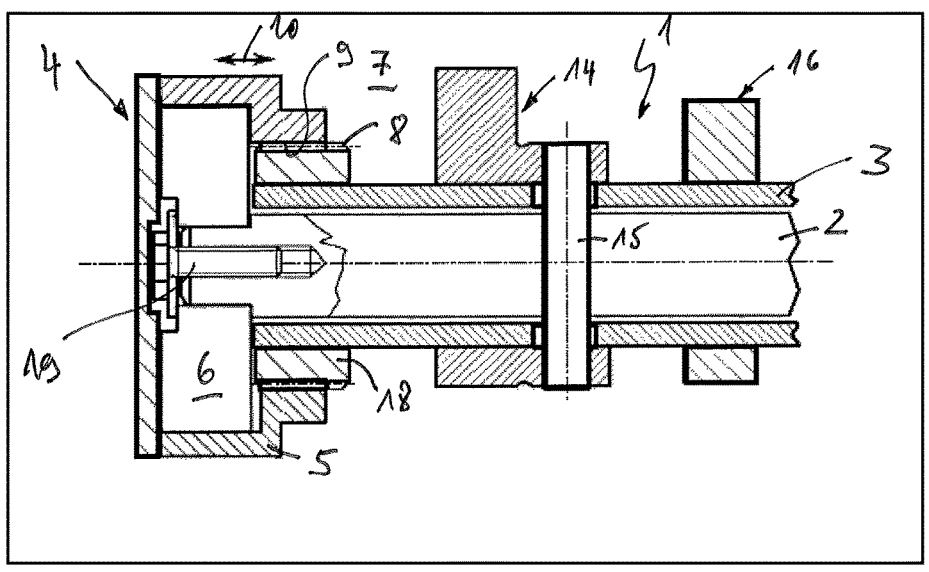

In the case of the camshaft shown according to FIG. 3, the rotor 6 is screwed to the inner shaft 2 in a fixed manner via a screw 19, likewise as according to FIG. 4. A tolerance offset between the outer shaft 3 and the stator 5 however is possible via the first and second connection contour 8, 9, wherein the first connection contour 8 in turn is arranged on a sleeve 18.

Looking at FIGS. 4 and 5 it is evident there that according to FIG. 4 the first connection contour 8 according to FIG. 5 the first and third connection contour 8, 11 are formed crowned and because of this make possible a tolerance offset with respect to a tilting 17. Since the inner shaft 2 according to FIG. 4 is coupled to the rotor 6 via the screw 19 in a fixed manner, the stator 5 in this case can follow for example an inclined position of the rotor 6.

The connection contours 8, 9, 11, 12 in this case can be formed for example as tooth contour or as polygonal contour for example as outer and inner polygon, for example as outer hexagon and inner hexagon. Here it is merely important that a torque transmission free of play is possible in order to be able to achieve an exact control of the valve opening times.

With the camshaft 1 according to the invention it is possible for the first time compared with camshafts known up to now from the prior art to offset tolerances both in axial direction 10 and also if applicable also in radial direction 13 or with respect to a tilting 17 and in order to be able to thereby ensure an easy adjustability of the camshaft 1 in the long term, in particular by preventing a jamming of the phase shifter 4.

The invention claimed is:

1. An adjustable camshaft comprising:
an inner shaft and an outer shaft arranged coaxially thereto; and
a phase shifter having a stator and a rotor, the stator being connected to the outer shaft in a rotationally fixed manner, and the rotor being connected to the inner shaft in a rotationally fixed manner; and
a first cam fixed to the inner shaft in a rotationally fixed manner by a pin;
a second cam fixed on the outer shaft in a rotationally fixed manner by one of a thermal joining fit, welding, soldering, gluing, or a press fit;
wherein on an outside of the outer shaft, a first connection contour is provided, the first connection contour interacting with a second connection contour on the stator formed complementarily thereto in a form-fit manner and enabling at least a tolerance offset in an axial direction;
wherein on an outside diameter of the inner shaft, a third connection contour is provided, the third connection contour interacting with a fourth connection contour on the rotor formed complementarily thereto in a form-fit manner and enabling at least a tolerance offset between the rotor and the inner shaft in the axial direction;
wherein the first connection contour and the third connection contour are each formed crowned;
wherein the first connection contour is arranged on a sleeve fastened on the outer shaft, the sleeve being located between the outer shaft and the stator; and
wherein the sleeve is one of welded, glued, crimped, or soldered on the outer shaft.

2. The camshaft according to claim 1, wherein the first connection contour is formed integrally with the outer shaft.

3. The camshaft according to claim 1, wherein at least one of:
the first connection contour and the second connection contour are formed in such a manner that the first and second connection contours allow at least one of a radial movability and a tilting of the stator to the outer shaft; and
the third connection contour and the fourth connection contour are formed in such a manner that the third and fourth connection contours allow at least one of a radial movability and a tilting of the rotor to the inner shaft.

4. The camshaft according to claim 1, wherein the second and fourth connection contours are formed crowned.

5. The camshaft according to claim 1, wherein at least one of the first and the second connection contours and the third and the fourth connection contours are formed as one of a tooth contour or a polygonal contour.

6. The camshaft according to claim 5, wherein at least one of the first and the second connection contours and the third and the fourth connection contours are formed as a polygonal contour having an outer hexagon and an inner hexagon.

7. The camshaft according to claim 1, wherein a width of an opening in the outer shaft through which the pin is inserted is greater than a diameter of the pin.

* * * * *